(12) United States Patent
Vermeulen

(10) Patent No.: US 9,440,486 B1
(45) Date of Patent: Sep. 13, 2016

(54) SYSTEM AND METHOD FOR PACKING SPOKED WHEELS FOR A HUMAN-POWERABLE VEHICLE

(71) Applicant: Bert Vermeulen, Cheyenne, WY (US)

(72) Inventor: Bert Vermeulen, Cheyenne, WY (US)

( * ) Notice: Subject to any disclaimer, the term of this patent is extended or adjusted under 35 U.S.C. 154(b) by 1 day.

(21) Appl. No.: 14/544,975

(22) Filed: Mar. 11, 2015

Related U.S. Application Data

(60) Provisional application No. 61/951,826, filed on Mar. 12, 2014.

(51) Int. Cl.
| | |
|---|---|
| B60B 1/00 | (2006.01) |
| B60B 1/02 | (2006.01) |
| B60B 27/02 | (2006.01) |
| B65B 25/24 | (2006.01) |

(52) U.S. Cl.
CPC ............ *B60B 1/003* (2013.01); *B60B 1/02* (2013.01); *B60B 27/023* (2013.01); *B65B 25/24* (2013.01); *B60B 2320/10* (2013.01); *B60B 2900/50* (2013.01); *B60Y 2200/13* (2013.01)

(58) Field of Classification Search
CPC . B60B 1/003; B60B 27/023; B60B 2320/10; B60B 2900/50; B65B 25/24
See application file for complete search history.

(56) References Cited

U.S. PATENT DOCUMENTS

| | | | |
|---|---|---|---|
| 578,350 A | 3/1897 | McCain | |
| 605,870 A | 6/1898 | Gubelmann | |
| 1,410,047 A | 3/1922 | Williams | |
| 1,511,291 A | 10/1924 | McGrath | |
| 1,593,474 A | 7/1926 | Serrao | |
| 2,297,960 A | 10/1942 | Hood | |
| 2,917,816 A | 12/1959 | Samson | |
| 3,329,444 A | 7/1967 | Lidov | |
| 4,154,327 A | 5/1979 | Haeussinger | |
| 4,182,522 A | 1/1980 | Ritchie | |
| 5,205,573 A | 4/1993 | Mhedhbi | |
| 5,419,619 A | 5/1995 | Lew | |
| 5,553,950 A | 9/1996 | Pawsat et al. | |
| 5,647,643 A | 7/1997 | Noble | |
| 5,810,453 A | 9/1998 | O'Brien | |
| 5,813,770 A | 9/1998 | Chiang | |
| 6,030,052 A | 2/2000 | Watarai et al. | |
| 6,364,424 B1 | 4/2002 | Lashlee et al. | |
| 6,374,975 B1 | 4/2002 | Schlanger | |
| 6,702,312 B1 | 3/2004 | Miksik | |
| 7,125,029 B2 * | 10/2006 | Knox | B62K 17/00 280/221 |
| 7,357,460 B2 | 4/2008 | Schlanger | |
| 7,658,450 B2 | 2/2010 | Mercat et al. | |
| 7,874,625 B2 | 1/2011 | Addink | |

(Continued)

FOREIGN PATENT DOCUMENTS

EP      2628673      7/2009

*Primary Examiner* — John Walters
*Assistant Examiner* — James Triggs

(57) ABSTRACT

A system for packing a human-powerable vehicle uses an inner annular module that can be incorporated into a wheel. The inner annular module has a open central region, attachment points for steel spokes in tension that radiate out from the annular module, and a feature to facilitate the detachable attachment of a hub by a user, so that a user detachable hub can be installed in the open central region when the annular module is used as part of a vehicle wheel. Removal of the hub facilitates the placement of the module over the axle of a second wheel. The attachment points for the spokes that radiate outward are in a circular configuration that is concentric with the center of the annular module. The attachment points for the spokes are on two parallel planes.

20 Claims, 11 Drawing Sheets

(56) References Cited

U.S. PATENT DOCUMENTS

| | | |
|---|---|---|
| 7,909,412 B2 | 3/2011 | Ashman |
| 7,950,747 B2 * | 5/2011 | Mercat ................... B60B 1/003 29/894.331 |
| 8,052,225 B2 | 11/2011 | Inoue et al. |
| 8,113,529 B2 | 2/2012 | Spahr et al. |
| 8,113,593 B2 | 2/2012 | Spahr et al. |
| 8,162,344 B2 | 4/2012 | Hoogendoorn |
| 8,205,902 B2 | 6/2012 | Uimonen et al. |
| 8,251,460 B2 | 8/2012 | Veux |
| 8,308,178 B2 | 11/2012 | Hoerdum et al. |
| 8,371,659 B2 | 2/2013 | Fitzsimons |
| 8,414,006 B2 * | 4/2013 | Souvanny ................ B62M 1/36 280/260 |
| 8,485,335 B2 | 7/2013 | Schlanger |
| 2010/0052410 A1 | 3/2010 | Sherman et al. |
| 2011/0049966 A1 | 3/2011 | Sartin et al. |

* cited by examiner

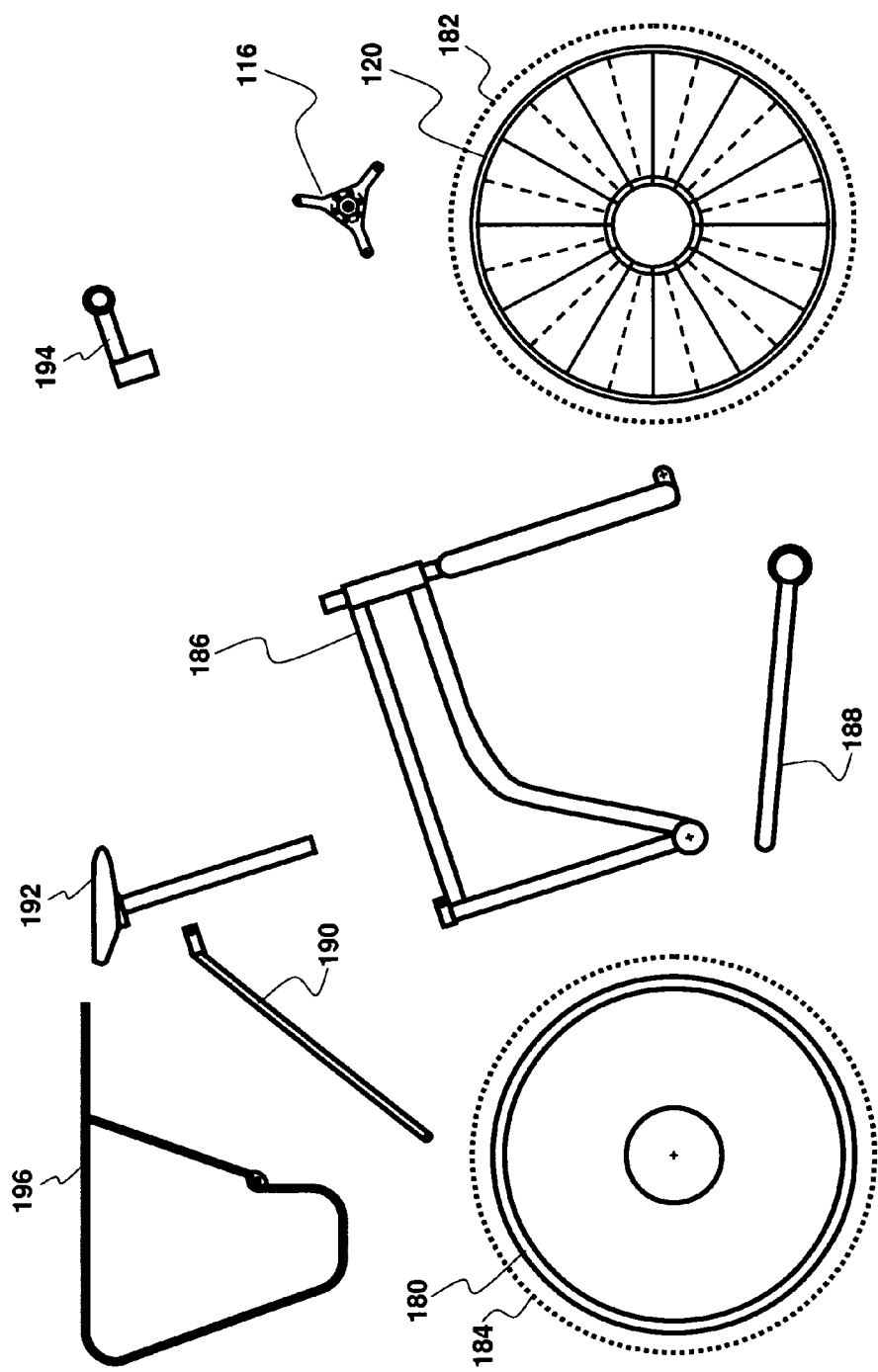

SYSTEM AND METHOD FOR PACKING SPOKED WHEELS FOR A HUMAN-POWERABLE VEHICLE

This application claims benefit of U.S. Provisional Patent Application Ser. No. 61/951,826 filed 12 Mar. 2014, the entire disclosures of which are incorporated by reference herein.

BACKGROUND

This disclosure relates to systems and methods for improving the ability to pack wheels and other vehicle components when a human-powerable wheeled vehicle is not being ridden. Examples of human-powerable wheeled vehicles include unicycles, bicycles, tricycles, quadricycles, wheelchairs, strollers, and vehicles such as electric bikes and mopeds that can use human power in addition to other power sources.

Wheeled human-powerable vehicles typically use a space frame structure because this provides high strength and stiffness for minimal weight, but space frame structures can result in a shape that takes more space than desired when stored or transported. Wheels that comprise a rim, a hub and steel spokes in tension between the hub and the rim are one example of a space frames structure that is difficult to pack because there is a conical bulge and axle in the wheel (and hub) center. It is difficult to pack two assembled wheels having these conical centers and axles together into a small space. However, prior to the wheel being assembled, the unassembled spokes, rims, tires, and hubs (with axles) take up little space.

Wheeled human-powerable vehicles are not always ridden. They are also transported over significant distances by other vehicles such as cars, public transit (buses, trains, etc), airplanes, boats, or other modes of transport. These human-powerable vehicles might also need to be hand carried over rough terrain or in an airport, bus terminal, or train station. In these situations, it is beneficial for the vehicle to be compactly packed, protected from other luggage, and covered in a way that protects others from any sharp or dirty elements of the wheeled human-powerable vehicle. Additionally, these human powerable vehicles can be stored and locked more easily they were in a more compact configuration.

One specific example is the transport of bicycles on commercial aircraft. In the past, airlines allowed passengers to check bicycles at no extra charge and even supplied bicycle boxes. Now many airlines charge for each piece of checked luggage. They charge even more for items that are oversize (length+width+height is greater than 62 linear inches) and/or overweight (typically over 50 pounds). If not properly packaged, the airline might refuse to take a bicycle or similar item that doesn't look like a suitcase or duffel bag. This creates a financial incentive to have a bicycle (or any other wheeled human-powerable vehicle) that can be packed within the 62 linear inch limit and weighs as little as possible.

There are bicycles that use small wheels and tires (20 inch or less), but bicycles with small wheels generally don't perform as well on a variety of road surfaces and terrain as bicycles with full-size wheels. For adult bikes, full-size wheels can be defined as wheels with tires nominally 24 inches in diameter or greater and small wheels have tires nominally 20 inches in diameter or smaller. Here is a list of common small and full wheel and tire sizes:

| Common name (nominal outside diameter of tire) | Outside diameter of rim | Bead seat diameter (inside diameter of tire) |
|---|---|---|
| 700C/29 inch | 648 mm (25.5 inches) | 622 mm (24.5 inches) |
| 650B/27.5 inch | 610 mm (24 inches) | 584 mm (23 inches) |
| 26 inch | 585 mm (23 inches) | 559 mm (22 inches) |
| 24 inch | 533 mm (21 inches) | 507 mm (20 inches) |
| 20 inch | 477 mm (19 inches) | 451 mm (18 inches) |
| 20 inch | 432 mm (17.75 inches) | 406 mm (16.25 inches) |
| 16 inch | 375 mm (14.75 inches) | 349 mm (13.75 inches) |

Some bicycles with small wheels use ingenious methods for folding the bike to convert from a compact configuration to a ridable configuration quickly, cleanly, and without the use of special tools. Some folding bicycles with small wheels can fold small enough to fit into a rectangular volume that meets the airline checked luggage 62 linear inch size requirement and the 50 pound weight limit. It's much easier to fit into 62 linear inches when the wheel is less than one third of the total length+width+height, which is what occurs when the nominal outside diameter of the tire is 20 inches or less.

There are bicycles with full-size wheels that can fit within airline 62 linear inch size requirements for normal checked luggage, but these bicycles require time, tools, and expertise to disassemble and reassemble. Packing these bikes with full-size wheels into 62 linear inches is difficult. Referring to the previous list of bike wheel sizes, a typical road bike uses 700C wheels, which have an outside diameter of the tire of between 28 and 29 inches and an outside diameter of the rim of approximately 25.5 inches. Thus, the typical suitcase for these bikes is 26×26×10 inches. It takes removing the air from the tires, many disassembly steps, detailed instructions, tools, and patience to work out how to get all of the parts to fit into a case having these dimensions.

One problem with trying to fit a bike with full-size wheels into the airline maximum of 62 linear inches, is that the wheels are both large in diameter and fat in the center due to the use of tension spokes in a triangular configuration when looked at in cross section or a conical configuration when viewed three dimensionally. The spokes typically terminate in a set of holes in one plane in the rim and terminate in two parallel planes in a circular configuration in the hub. When looked at in cross section this looks like a triangle that is wide at the hub and narrow at the rim. When two wheels with fat centers are put into a 26×26×10 case, there is almost no room for anything else. Any space that can be saved by having the wheels stored more compactly could simplify the task of packing the other parts of the bicycle and might mean that the rest of the bike doesn't need to be disassembled as completely. It is known to have wheels that are disassemblable to save space, but these disassemblable wheels typically do not use spokes in tension in a triangular/conical configuration. Wheels using spokes in tension in a triangular/conical configuration are desired because this configuration because this space frame configuration has a high strength to weight ratio. Because weight is paramount for a human-powered vehicle, the vast majority of bicycle wheels have spokes in tension in a triangular/conical configuration.

Many bicycles that are transported as checked luggage require a structural case. These cases add to the total weight of the luggage. There is also the issue of what to do with this case when one arrives at a destination and wants to start riding the bicycle. It is better if the bicycle can be configured in a compact arrangement and require minimal or no external container used solely as a suitcase. If the bicycle can be its own suitcase, this would be ideal.

To summarize, it is desired to have a system and method for packing a human-powerable vehicle that is (a) is as lightweight as possible and (b) minimizes the space needed. Such as system would likely use spoked wheels, which can be bulky to pack if built using conventional hubs. Ideally, such a system (c) would not require the use of a separate structural suitcase to transport the tires and/or tires and bicycle frame.

BRIEF DESCRIPTION OF THE DRAWINGS

The present disclosure is described in conjunction with the appended figures in which:

FIG. 10 shows the bicycle of FIG. 9 when disassembled;

Figure 1A:
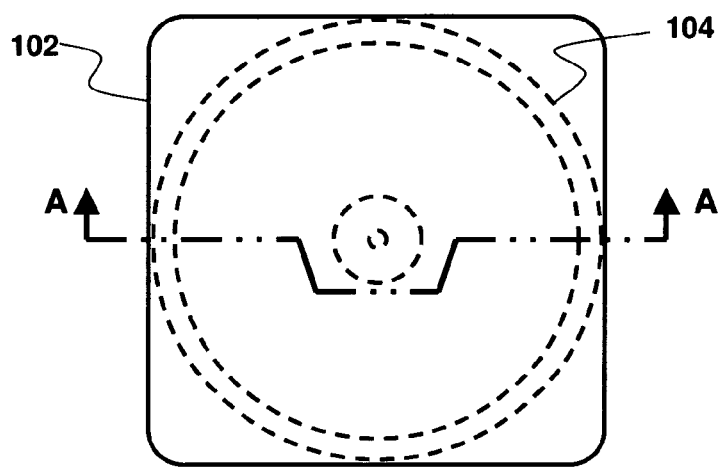
FIG. 1A shows a top view of two spoked 700C bicycle wheels in a 26×26×10 inch container.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, those skilled in the art will know that different materials, manufacturing processes, fastening systems, and components may be substituted.

1. Definitions

In one embodiment, the system and/or method being disclosed is a system or method for a wheeled vehicle that is human powerable. For purposes of this disclosure and the appended claims, a wheeled human powerable vehicle shall be defined to mean any wheeled vehicle suitable for transporting something in which the human can add or exclusively provide locomotive power. Examples include bicycles, motor-assisted bicycles (such as mopeds, e-bikes, etc), wheelchairs, tricycles, unicycles, quadricycles, tandems, etc. In this disclosure and the appended claims, the term bicycle is used to describe a wheeled human powerable vehicle that can transport a human and has two wheels. The term bicycle includes tandems, recumbents, and any other combination of a plurality (at least two) wheels, with any attachment between them, or no other components or attachment between them. Thus, a bicycle also comprises any pair of wheels, with or without any other components.

In one embodiment, the system and/or method being disclosed comprise an annulus, annular module, or ring-shaped module. For purposes of this disclosure and the appended claims, an annulus (or annular module) shall include any ring-shaped structure having a central region in the form of opening or aperture that facilitates the nesting of components partially or completely inside of one another. An annulus can be monolithic. An annulus can be assembled from multiple components. An annulus can be substantially flat with all features lying in one flat plane having a thickness many times smaller than the outside diameter of the annulus. An annulus can be thick in its axial direction. An annulus can be composed of elements that create attachment points that are planar (or co-planar) without the annulus necessarily occupying all spaces in the volume or plane connecting those points. An annulus can be cup-shaped with one side that is not open or only partially open. An annulus can have a completely open center throughout its entire shape.

In one embodiment, the system and/or method being disclosed comprise an annular wheel. A wheel can be any circular component that is intended to rotate about a central axis. A wheel can have an axial bearing. For purposes of this disclosure and the appended claims, a wheel does not necessarily need to have an axial bearing or central hub. A wheel can also be a circular component to which an axle, an axial bearing, or a hub is to be attached. Thus, a wheel can be annular, with a central opening or aperture that facilitates the nesting of components partially or completely inside of one another. A wheel can be monolithic. A wheel can be assembled from multiple components. A wheel can use spokes. The spokes can be in tension. A wheel can be of any other shape or configuration using any other components capable of being understood by anyone skilled in the art.

2. Compact Storage of Multiple Wheels

Figure 1B:
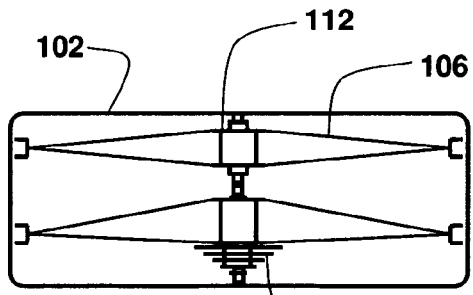
FIG. 1B shows section A-A of FIG. 1A for two prior art spoked 700C bicycle wheels.
Figure 1C:
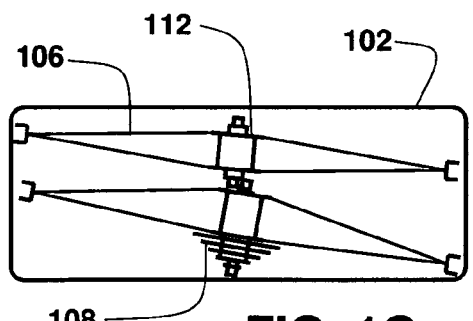
FIG. 1C shows section A-A of FIG. 1A for two prior art spoked 700C bicycle wheels when the wheels are angled slightly to reduce total stack height.
Figure 1D:
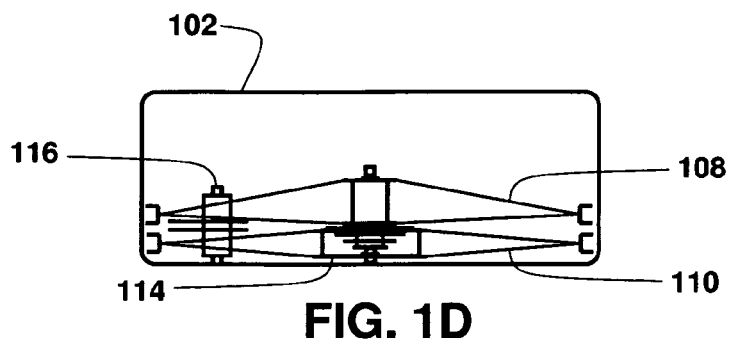
FIG. 1D shows section A-A of FIG. 1A when the prior art spoked 700C front wheel has been replaced with an embodiment of the present invention—a spoked wheel incorporating a central annulus with an aperture that allows the axle of the rear wheel to nest inside the aperture.

FIG. 1D illustrates one configuration and method that may be employed in embodiments of the present invention. To understand this configuration and method, it is best to start with the prior art. FIG. 1A shows a top view of one or more bicycle wheels 104 in a container 102. More specifically, the bicycle wheels 104 being shown have the dimensions of standard 700C or 29-inch wheels. This means that the wheels 104 have rims with an outside diameter of approximately 25.5 inches (622 millimeters). The container 102 has been sized to meet the airline checked luggage requirement of 62 linear inches (1575 millimeters). Given the outside diameter of the bicycle rims, the fact that the rims will most likely have tires on them (typically the tires are deflated), and the fact that the container walls will have a thickness that must be within the total dimensions, the minimum length and the minimum width of the container will be approximately 26 inches. Subtracting 26+26=52 inches from the 62 linear inch size limit, the container can have a maximum height of about 10 inches. Therefore, the container shown at 102 in FIGS. 1A, 1B, 1C, and 1D is 26×26×10 inches. In the prior art, the typical container used for transporting bicycles in this way can be a hard shell plastic suitcase in a clamshell configuration, a soft bag with wheels, or some configuration of hard and soft components. The prior art containers that are designed to fit bicycles with 700C/29 inch wheels typically have length and width dimensions that are within ½" per side of the 26 inch dimension shown because that's the only way the get the prior art bicycles with 700C/29 inch wheels into the 62 linear inch airline maximum.

FIG. 1B, which is a side view of section A-A of FIG. 1A, illustrates the next issue when trying to pack a bicycle into an airline size container using the systems and methods known in the prior art. Referring to FIG. 1B, prior art spoked 700C front wheel is shown at 106 and a spoked 700C rear wheel is shown at 108. The standard dropout spacing for a front wheel is 100 mm. There is typically an additional 5 mm per side of axle so the wheel can fit into the front dropouts, making a total axle length of 110 mm for a front wheel. The standard dropout spacing for a rear wheel is 130 mm for a road bike, and the rear wheel has 5 mm of additional axle length on each side for a total axle length of 140 mm. In FIG. 1B, the two wheels 106 and 108 are axially aligned and the total height of the two stacked wheels is therefore 110 mm+130 mm=240 mm, which is approximately 9.5 inches. Thus, the stack height of the two hubs and the two axles almost exactly takes up the entire interior height of the 10-inch high container once the wall thickness is subtracted. Other bicycle parts (the frame, handle bars, pedals, seat, etc) must fit into the remaining space or there must be a second piece of luggage, which will cost extra. The remaining space in the prior art systems and methods for packing a bicycle are minimal and broken up into multiple small regions. Tilting the wheels as shown in FIG. 1C does not buy much additional space because it is not possible to tilt the wheels to a very great angle. Thus, many compromises must be made, it takes a lot of time and experimentation to try to get the bike to fit at all, and many people give up on this as a solution. Furthermore, cramming the bike wheels, frame, and components into the container in this way can result in damage as parts rub against each other. To prevent this each part is typically individually wrapped in a protective material, which requires additional time, expense, and weight.

FIG. 1D illustrates a configuration and method that greatly simplifies how a bicycle can be packed compactly. The container 102 and rear wheel 108 shown in FIG. 1D are the same as what has been illustrated previously with reference to the prior art. The spoked front wheel, shown at 110 has been modified by replacing the central hub assembly, shown at 112 in FIG. 1B and FIG. 1C with an annulus (or annular module or ring-shaped module), shown at 114 in FIG. 1D, and a user removable hub shown at 116. The annulus 114 has a concentric central aperture region. This central aperture region of the annulus allows at least part of the thick central hub (and axle) of the rear wheel to nest inside the front wheel. As shown in FIG. 1D, the entire space in the container 102 above the rear wheel 108 then becomes clear and available for packing other parts of the bicycle. The rear wheel 108 in FIG. 1D sits at the same position in the container 102 as for the prior art (FIG. 1B and FIG. 1C). Thus, the wheel configuration with a removable hub greatly facilitates the packing of a bicycle. The two wheels with the removable hub shown in FIG. 1D represent a simple embodiment of a packable bicycle that fits into 62 linear inches. Advantages of the front wheel embodiment shown in FIG. 1D include:

(a) more compact storage of the bicycle (especially if this is a bicycle using full-size wheels);
(b) potential for storing two bicycles with 26 inch wheels into the 62 linear inch checked luggage maximum;
(c) improved potential for rigidly attaching bicycle parts together to eliminate the need for wrapping each bicycle part prior to packing; and
(d) more room for the other bicycle components allows for more soft padding on the outside of the packed bicycle, which makes it easier to eliminate the weight, cost, and transportation of a hard-shell suitcase.

It should be noted that the two wheels illustrated in FIG. 1D do not necessarily need to be a front wheel with a removable hub and a rear wheel with a fixed hub. The rear wheel could have a removable hub. The front wheel could have a fixed hub. The two wheels could be two front wheels. The two wheels could be two rear wheels. The two wheels could rotate about the same axis and still be a two-wheeled vehicle. The two wheels could be two wheels from a vehicle that has more than two wheels. The two wheels could be for two different vehicles.

3. Detailed Description of One Embodiment

Figure 2:
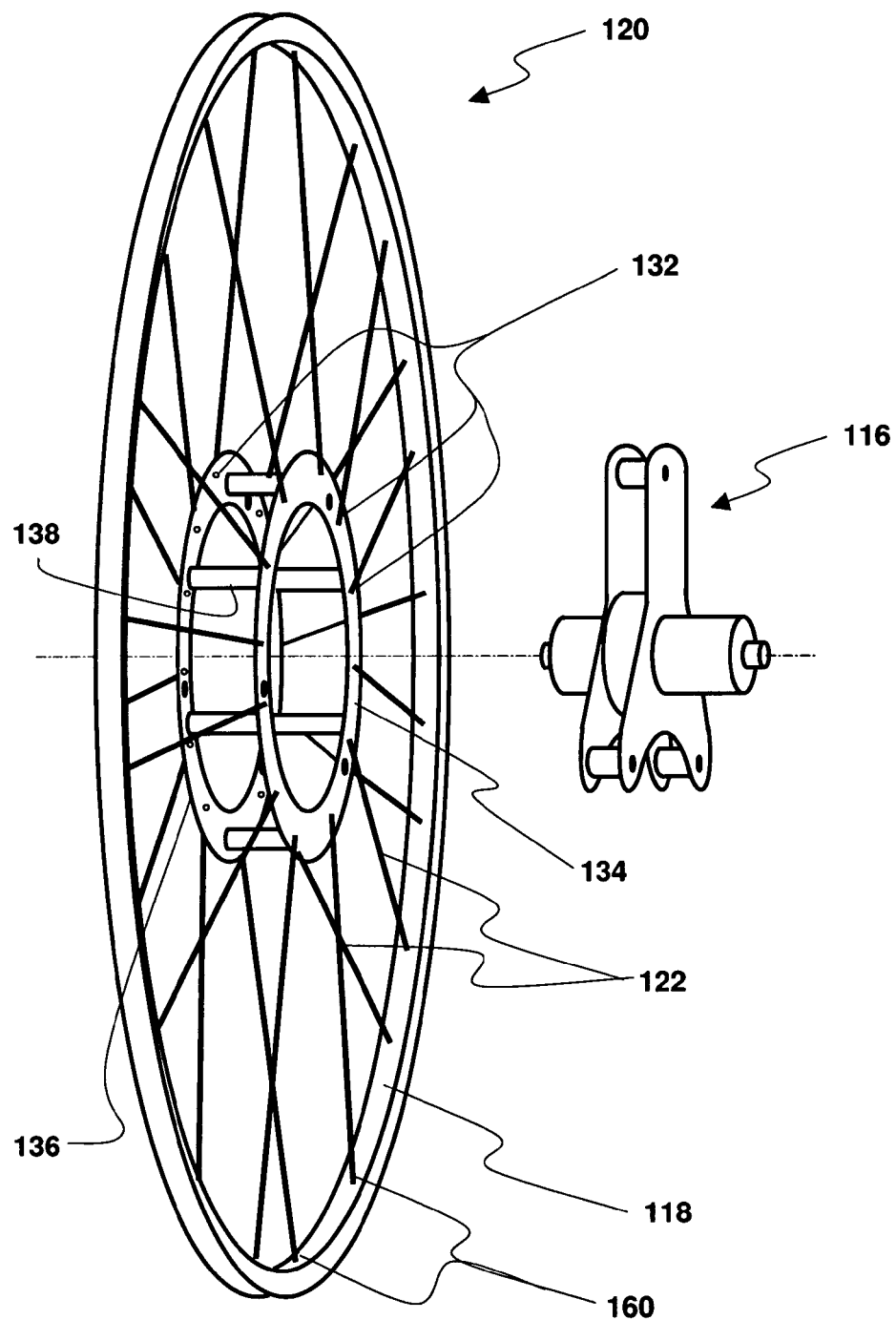
FIG. 2 shows a perspective view of a spoked bicycle wheel with central annulus and user detachable hub.

To better explain the concept and embodiments of the present invention, FIG. 2 shows a perspective view of a spoked wheel, shown at 120, and a user detachable hub, shown at 116. The spoked wheel 120 can be of any size and shape capable of being understood by anyone skilled in the art. Common human powerable vehicle spoked wheel sizes can include 700C/29 inch, 65B/27.5 inch, 26 inch, 24 inch, 20 inch, and 16 inch. The spoked wheel 120 comprises a rim, shown at 118, an inner annulus (or inner annular module or ring-shaped module), and a plurality of spokes, shown at 122 that radiate outwards from the inner annulus to connect the annulus to the rim. The rim 118 is circular and is located concentrically to the central axis of the wheel 120. Here is a table of common standard wheel and rim sizes that can be used as part of embodiments of the present invention:

| Common name (nominal outside diameter of tire) | Outside diameter of rim | Bead seat diameter (inside diameter of tire) |
|---|---|---|
| 700C/29 inch | 648 mm (25.5 inches) | 622 mm (24.5 inches) |
| 650B/27.5 inch | 610 mm (24 inches) | 584 mm (23 inches) |
| 26 inch | 585 mm (23 inches) | 559 mm (22 inches) |
| 24 inch | 533 mm (21 inches) | 507 mm (20 inches) |

| Common name (nominal outside diameter of tire) | Outside diameter of rim | Bead seat diameter (inside diameter of tire) |
|---|---|---|
| 20 inch | 477 mm (19 inches) | 451 mm (18 inches) |
| 20 inch | 432 mm (17.75 inches) | 406 mm (16.25 inches) |
| 16 inch | 375 mm (14.75 inches) | 349 mm (13.75 inches) |

It should be noted that the rim could be of any other size capable of being understood by anyone skilled in the art. The rim used on a wheel of a human-powerable vehicle can be made of any material capable of being understood by anyone skilled in the art. Examples of rim materials include aluminum, steel, titanium, wood (such as birch, spruce, oak, etc), carbon fiber reinforced composite, glass fiber reinforced composite, glass, and plastic. The rims can be fabricated using any process capable of being understood by anyone skilled in the art including the use of extrusion, machining, casting, molding, bending, stamping, autoclaving, heating, vacuum forming, and injection molding.

The spoked wheel 120 shown in FIG. 2 has 24 spokes. Other common spoke counts can include 3, 4, 5, 6, 8, 10, 12, 16, 18, 20, 24, 28, 32, 36, 40, 48, 72, 96, and 144 spokes. The spoke count can be any quantity capable of being understood by anyone skilled in the art. The inner annulus includes annulus spoke attachment points, shown at 132, for spokes that radiate outwards from the inner annulus. In the embodiment shown, the annulus spoke attachment points 132 are in a circular configuration on two offset parallel planes separated by spacers. In the embodiment shown, the spacers comprise a plurality of threaded tubular elements, having internal threads, which will be further detailed with reference to FIG. 3A and FIG. 3B. The circular configuration of the annulus spoke attachment points 132 is concentric to the center of the wheel 120. In the embodiment shown, the annulus spoke attachment points 132 are axial through holes. In the embodiment shown, the two offset (non coplanar) parallel planes are in the form of two annular (or ring shaped) disks, 124 (first annular disk) and 126 (second annular disk), and are separated by annular disk spacers, shown at 128. In the embodiment shown, the annular disks, 124 and 126, are located concentrically to the central axis of the wheel. In the embodiment shown, the spokes are configured to be in tension. In the embodiment shown, the spokes are configured in a generally triangular configuration if the wheel was looked at in a section view, with the two planes of annulus spoke attachment points 132 being offset. The spokes 122 are connected to the rim 118 at rim spoke attachment points, shown at 160. In the embodiment shown, the rim spoke attachment points 160 are in a common plane, in a circular configuration concentric to the axis of the wheel. The resulting configuration of the spokes 122 can also be described as two cones having their apex in the center of rotation of the wheel. It is also possible for the rim spoke attachment points 160 to be located in multiple offset parallel planes. For example, it is possible to attach the spokes from the first annular disk 124 to a plane on the rim that is offset and parallel to the plane on the rim where the spokes from the second annular disk 126 are attached. In the embodiment shown, the attachment points for the spokes 122 on the rim 118 are in the form or radial through holes in the rim 118. The placement of the spokes 122 from the annulus spoke attachment points 132 to the rim 118 can be in any configuration capable of being understood by anyone skilled in the art. The type of spokes 122 used can be any type of spoke 122 capable of being understood by anyone skilled in the art. A typical example is spokes 122 having shafts that comprise stainless steel (an alloy of iron, nickel, and other materials) and nipples (used to tension the spokes by rotation) that comprise brass.

Further referring to FIG. 2, the embodiment of the user detachable hub shown at 116 has three fingers that extend radially. The three fingers comprise hub attachment points. The user detachable hub 116 can be attached to the wheel 120 by a user without affecting spoke tension as will be described in the sections that follow.

Figure 3A:
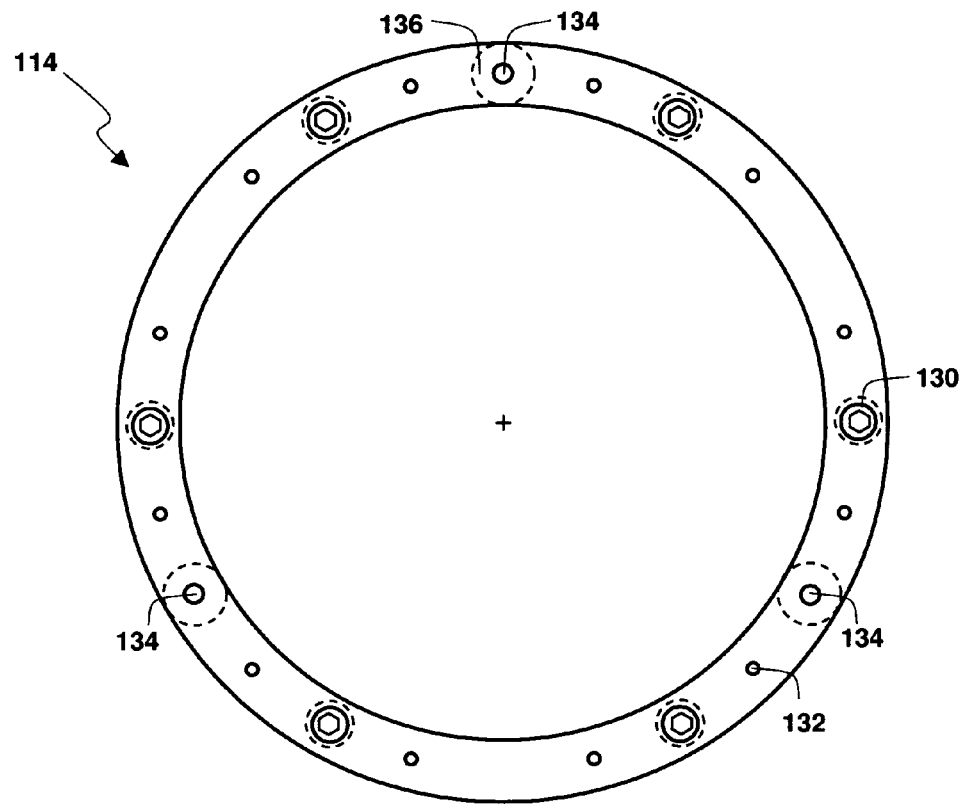
FIG. 3A shows an end view of an annulus suitable for use as part of a spoked wheel.
Figure 3B:
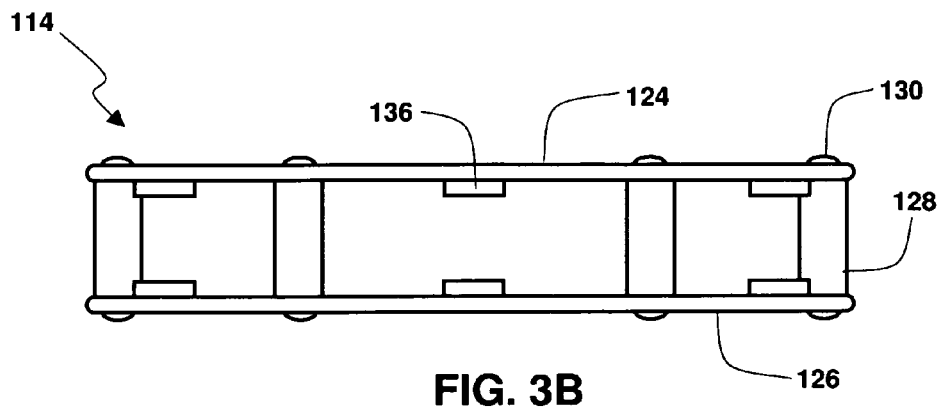
FIG. 3B shows a side view of the annulus of FIG. 3A.

FIG. 3A and FIG. 3B provide further detail of an embodiment of an annulus. FIG. 3A is an axial view. FIG. 3B is a side view of an annulus, with the annulus being shown at 114. The annulus 114 can also be called an inner annulus, an inner annular module, or a ring-shaped module. The annulus 114 shown in this embodiment comprises two parallel annular disks, shown at 124 and 126, separated by six disk spacers, shown at 128. The disk spacers 128 are attached to the annular disks, 124 and 126, by disk-spacer assembly bolts, shown at 130 that engage threads in the disk spacers 128. The annular disks, 124 and 126, comprise annulus spoke attachment points, shown at 132. The annulus spoke attachment points 132 are configured for spokes that will radiate outward from the annulus 114. The annulus spoke attachment points 132 are in a circular configuration. In the embodiment shown, the annulus spoke attachment points 132 are axial thru holes designed for spokes with j-bends. The annulus spoke attachment points 132 can be any type of attachment point capable of being understood by anyone skilled in the art including radial through holes. The embodiment of the annulus 114 shown has 12 spoke attachment points per disk, for a total of 24 annulus spoke attachment points 132. There can be any number of annulus spoke attachment points 132 per annular disk above a minimum of 2 and the number of annulus spoke attachment points 132 does not need to be the same for both annular disks. The annulus 114 also includes three hub attachment points shown at 134. In the embodiment shown, the annulus 114 is designed for fingers in the hub to extend within the annulus 114 and the fingers in the hub are intended to be placed between hub attachment bosses, shown at 136 and attached using hub-annulus attachment bolts, shown at 150 in FIG. 5 and FIG. 6A. In the embodiment shown, there are six hub attachment bosses 136, one on each side of each of the three fingers.

As mentioned previously, one important benefit of having an annulus is that the center of the wheel is open. This provides the opportunity for part of a second wheel to nest inside of this annulus to reduce overall stack height for multiple wheels. An analysis of various wheels and hubs has identified the following diameters as being typical for the centers of wheels that one might want to nest inside the annulus:

| Diameter of a hub in various locations | Typical size |
|---|---|
| Outside diameter on non-flange side for a rear wheel that does not have disk brakes taken 1 inch from end of axle | 1 inch (25 mm) |
| Outside diameter of a disk brake flange | 2 inches (50 mm) |
| Outside diameter of an 18-tooth cog | 4 inches (100 mm) |
| Outside diameter of a 36-tooth cog | 6 inches (150 mm) |
| Outside diameter of a disk brake | 8 inches (200 mm) |

Given the information above, it is beneficial to have the aperture of the annulus be as large as possible, and 1 inch (25 mm), 2 inches (50 mm), 4 inches (100 mm), 6 inches (150 mm), and 8 inches (200 mm) are good targets to shoot for.

Figures 4A, 4B:
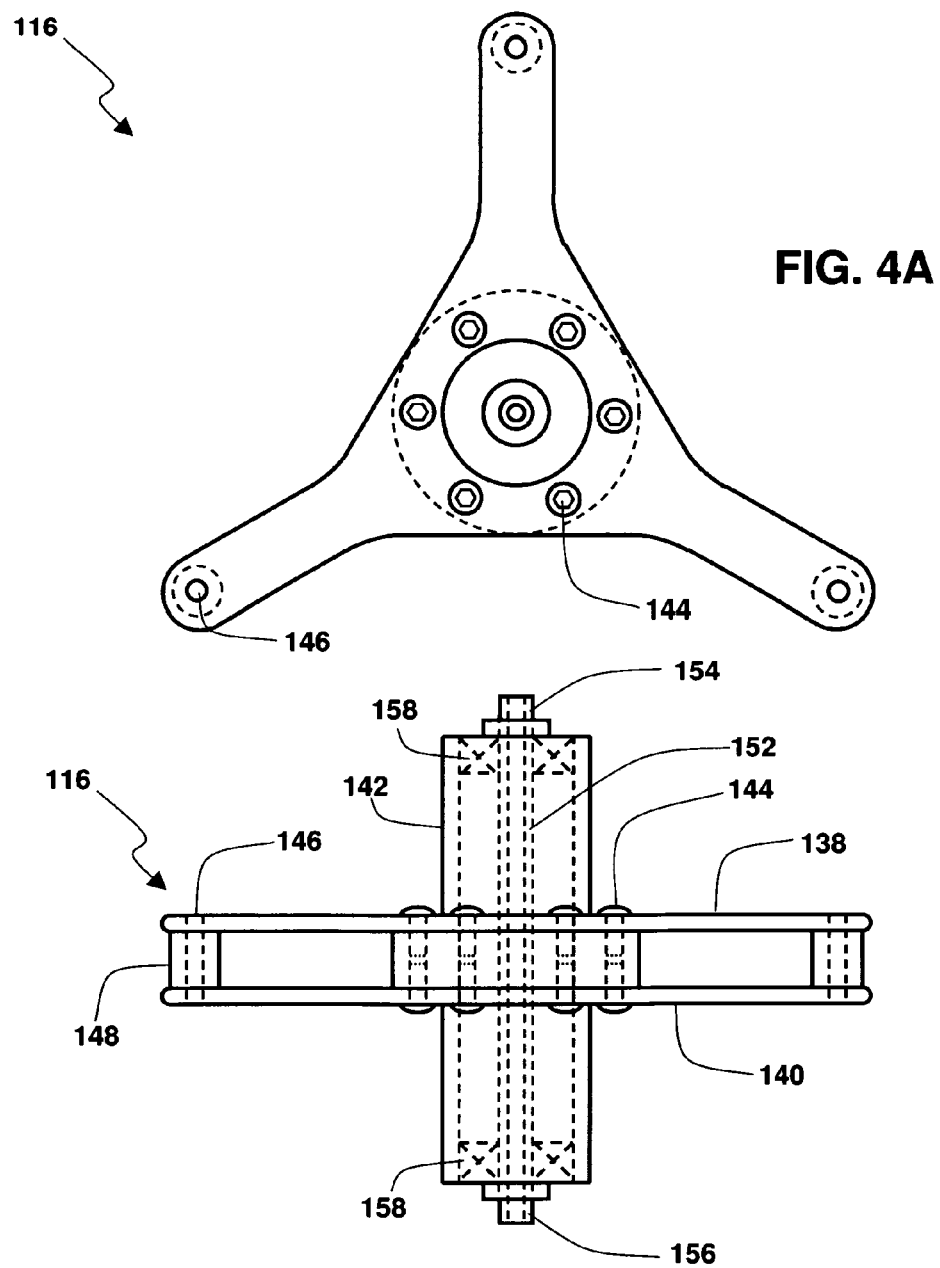
FIG. 4A shows an end view of a removable hub suitable for use with the annulus of FIG. 3A and FIG. 3B.
FIG. 4B shows a side view of the removable hub of FIG. 4A.

FIG. 4A and FIG. 4B provide detail of an embodiment of a user detachable hub at 116. The detachable hub 116 comprises two flat spiders, shown at 138 and 140 that are attached to a hub body, shown at 142, using spider attachment bolts, shown at 144. Each spider has three fingers that extend outwards to annulus attachment points, shown at 146. There are three finger spacers, shown at 148, which ensure that the fingers are in the correct positions and can be compressed when placed into the annulus 114. The detachable hub also comprises a central axle, shown at 152. The central axle 152 has two frame attachment regions, one on each end, shown at 154 and 156. These frame attachment regions, 154 and 156, will fit into the dropouts on a bicycle frame. If this is a hub for a front wheel, the frame attachment regions, 154 and 156 will fit into the dropouts on the front fork of the bicycle frame. If this is a hub for a rear wheel, the frame attachment regions will fit into the dropouts on the rear triangle of the frame, which are typically either part of the chain stays, the seat stays, or of an integrated rear triangle that comprises both seat stays and chain stays. The detachable hub 116 also comprises bearings (typically 2 sets), shown at 158, which are typically inside the hub body and allow the hub body 142 to rotate about the axle. The remaining parts and configuration possibilities of the detachable hub can be similar to other bicycle hubs and capable of being understood by anyone skilled in the art. For example, the central axle 152 shown is a hollow cylinder that is designed for attachment to a bicycle frame using a skewer. The bearings shown are cartridge bearings, but open unsealed bearings could also be used.

Figure 5:
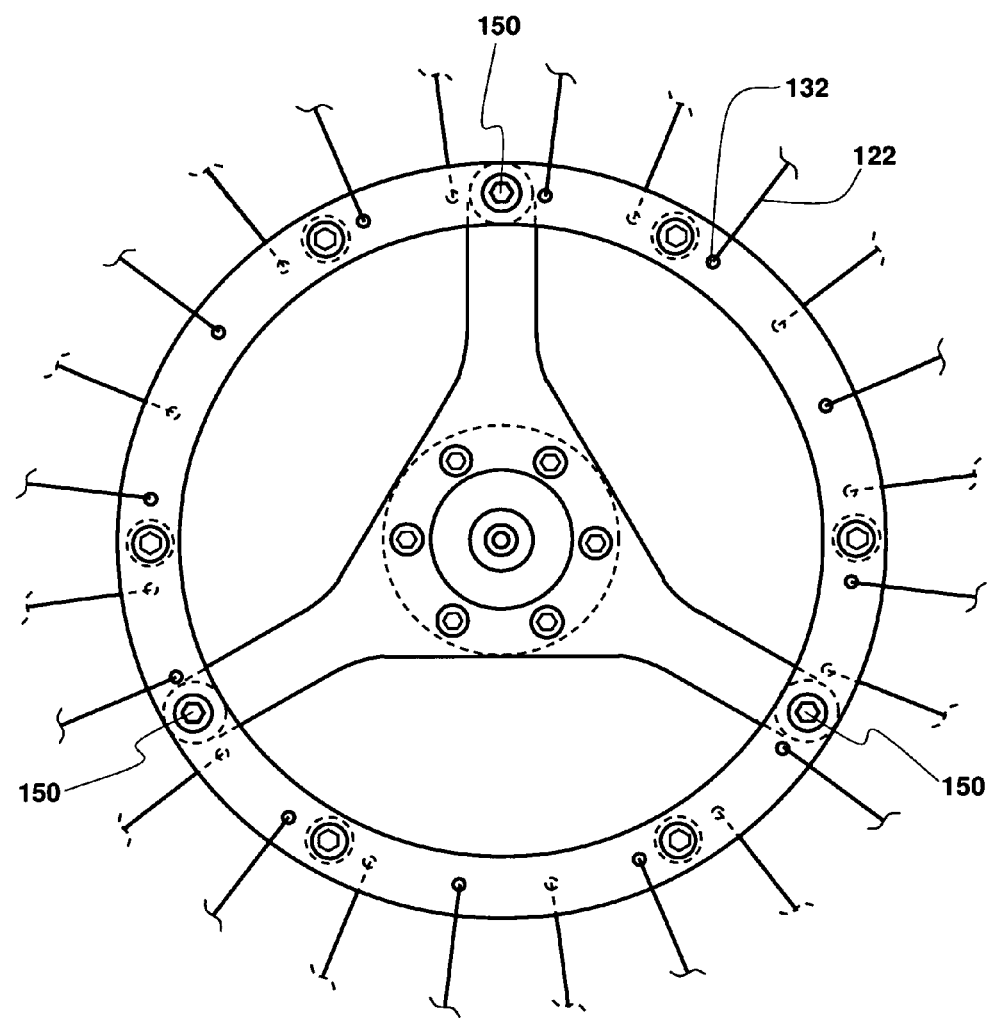
FIG. 5 shows an end view of the removable hub of FIG. 4A assembled into a spoked version of the annulus of FIG. 3A.
Figure 6:
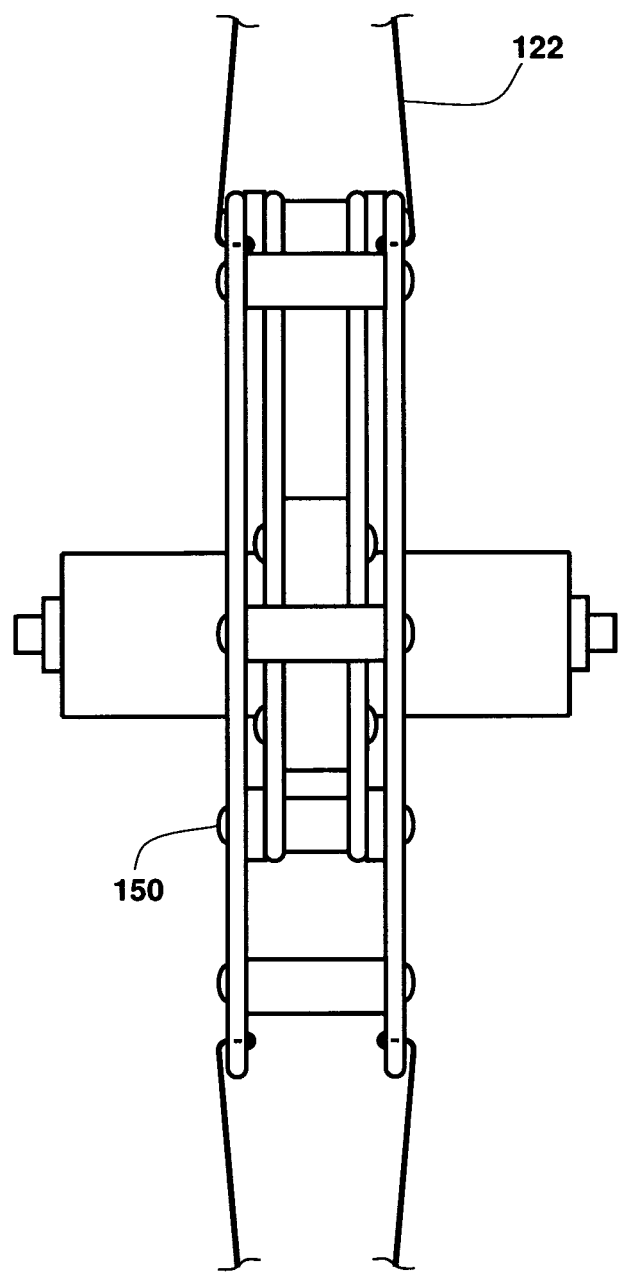
FIG. 6 shows a side view of the assembly of FIG. 5.

FIG. 5 and FIG. 6 show the removable hub assembled into the annulus. In addition, FIG. 5 shows how the spokes radiate out from the annulus spoke attachment points 132.

Figure 7A:
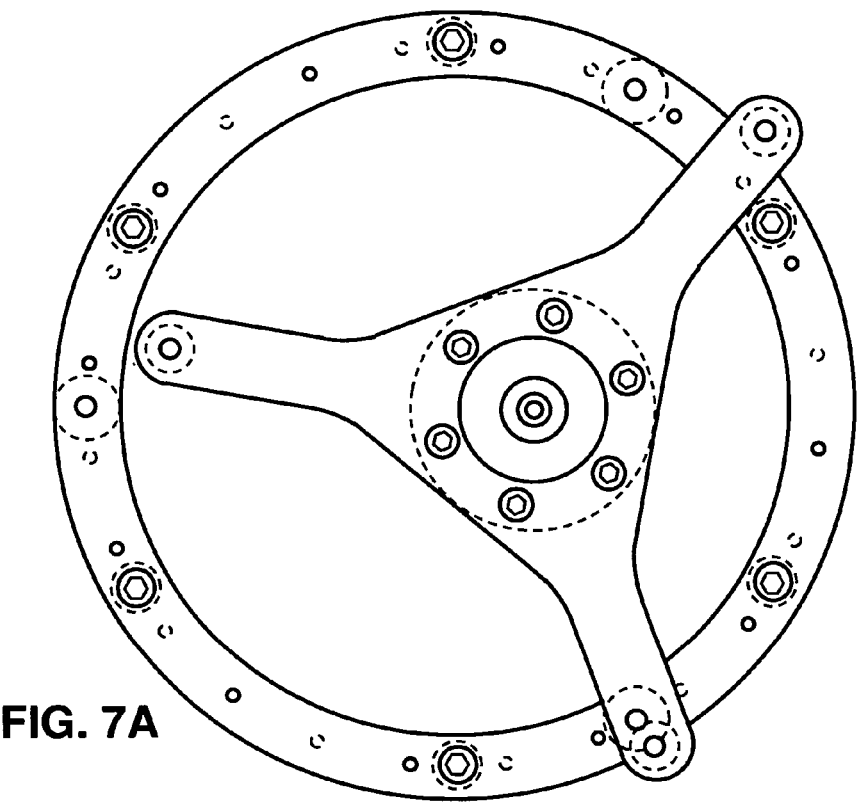
FIG. 7A shows an end view of how the detachable hub can be placed inside the annulus shown in FIGS. 3A and 3B.
Figure 7B:
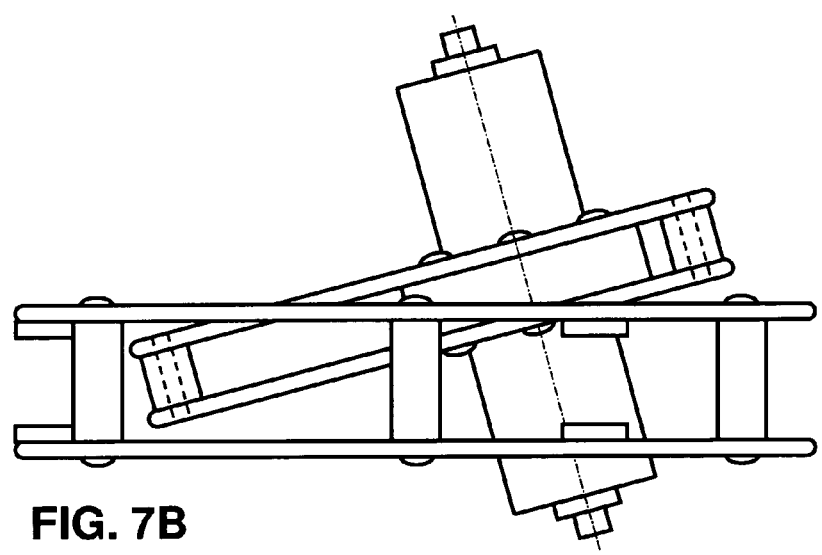
FIG. 7B shows a side view of how the detachable hub can be placed inside the annulus shown in FIGS. 3A and 3B.

FIG. 7A and FIG. 7B show how a hub (having fingers extending to a diameter greater than the inside diameter of the annulus) can be placed inside the annulus. The process involves selectively tilting the hub, placing one finger in the annulus and then sliding the hub to a position where the next finger can be inserted, until all three fingers are inserted and the detachable hub can be rotated so each of the three fingers is in position between the finger spacers.

4. Description of Alternate Embodiments

Figure 8A:
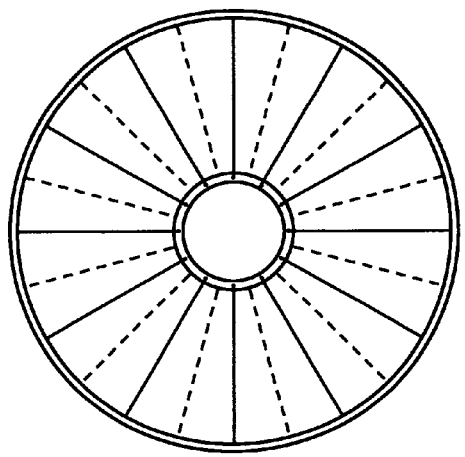
FIG. 8A shows radial spoking between an annulus and a rim.
Figure 8B:
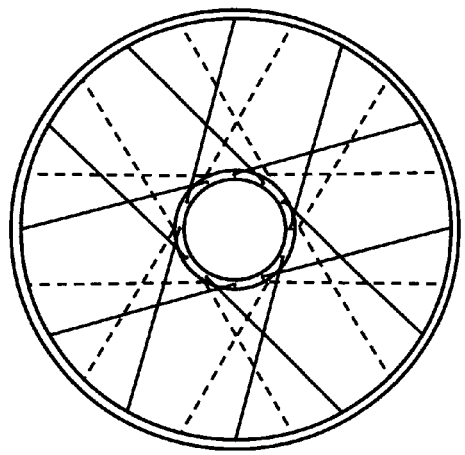
FIG. 8B shows tangential spoking between an annulus and a rim.
Figure 8C:
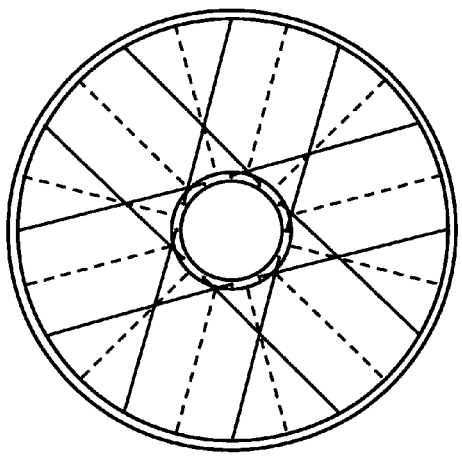
FIG. 8C shows a combination of radial and tangential spoking between an annulus and a rim.

FIG. 8A, FIG. 8B, and FIG. 8C show examples of spoke lacing patterns that can be used with embodiments of the present invention. For ease of understanding the spokes that reach the front plane of the annulus for these wheels are shown as solid lines and the spokes that reach the rear plane of the annulus are shown as dotted lines. FIG. 8A shows an embodiment in which both the front and the rear spokes are laced radially. FIG. 8B shows an embodiment in which both the front and the rear spokes are laced tangentially. FIG. 8C shows an embodiment in which the spokes in the two planes are laced differently from each other. In the configuration show in FIG. 8C, the front spokes are tangentially laced and the rear spokes are radially laced. There can be advantages and disadvantages to each of these types of lacing patterns that are well understood by those skilled in the art. For example, the radial-radial pattern shown in FIG. 8A is often used for front wheels on bicycles with rim brakes because these wheels carry no tangential load and this configuration maximizes the radial and axial loads that can be carried. Rear wheels do carry tangential loads as a result of the torque being applied by the cyclist to the hub needing to be transmitted to the rim and tires, so a tangential-tangential spoke pattern such as that shown in FIG. 8B is most often used. A mixed tangential-radial pattern, such as that shown in FIG. 8C can be beneficial in some situations.

Additional alternate embodiments of the wheel or wheels can include combinations of any elements described in this disclosure and/or:

- a configuration of the annulus in which straight spokes instead of j-bend spokes are used and therefore the inner attachment points of the spokes are through holes in a hollow cylinder located on two parallel planes that are perpendicular to the central axis of the wheel;
- the annulus can have an orientation feature that visually or physically helps the user to identify the correct orientation of the annulus relative to the detachable hub when the annulus and the detachable hub are to be attached to each other (orientation in this disclosure means which end of the axle of the hub is most proximate to which of the parallel annular disks);
- the annulus can have a rotation feature that visually or physically helps the user to identify the correct rotation of the annulus to the detachable hub when the annulus and the detachable hub are to be attached to each other (orientation in this disclosure means rotation of the annulus relative to the hub about their common central axis);
- the detachable hub can have an orientation feature that visually or physically helps the user to identify the correct orientation of the detachable hub relative to the annulus when the detachable hub and the annulus are to be attached to each other;
- the detachable hub can have a rotation feature that visually or physically helps the user to identify the correct rotation of the detachable hub relative to the annulus when the detachable hub and the annulus are to be attached to each other;
- an attachment system between the annulus and the removable hub that comprises a snap attachment element whereby a cyclist can detach and reattach a hub without the use of tools; and/or
- a wheel configuration that has no central hub. Instead, there could be a ring shaped inner annulus (to which the spokes are attached) that further comprises one or more bearings that have a large central opening. One race of this bearing or bearings could be attached to the annulus. The other race could be attached to a ring-shaped element that does not rotate when the wheel rotates and this ring-shaped element could be attached to one arm of a front "fork" that then attaches to the rest of the bike frame in a way that is very similar to the "Lefty" fork made by Cannondale. Thus, the wheel and fork would always have a large diameter aperture that allows a real wheel to nest inside of the center of a front wheel.

5. Embodiments can Include Additional Bicycle Components

Figure 9:
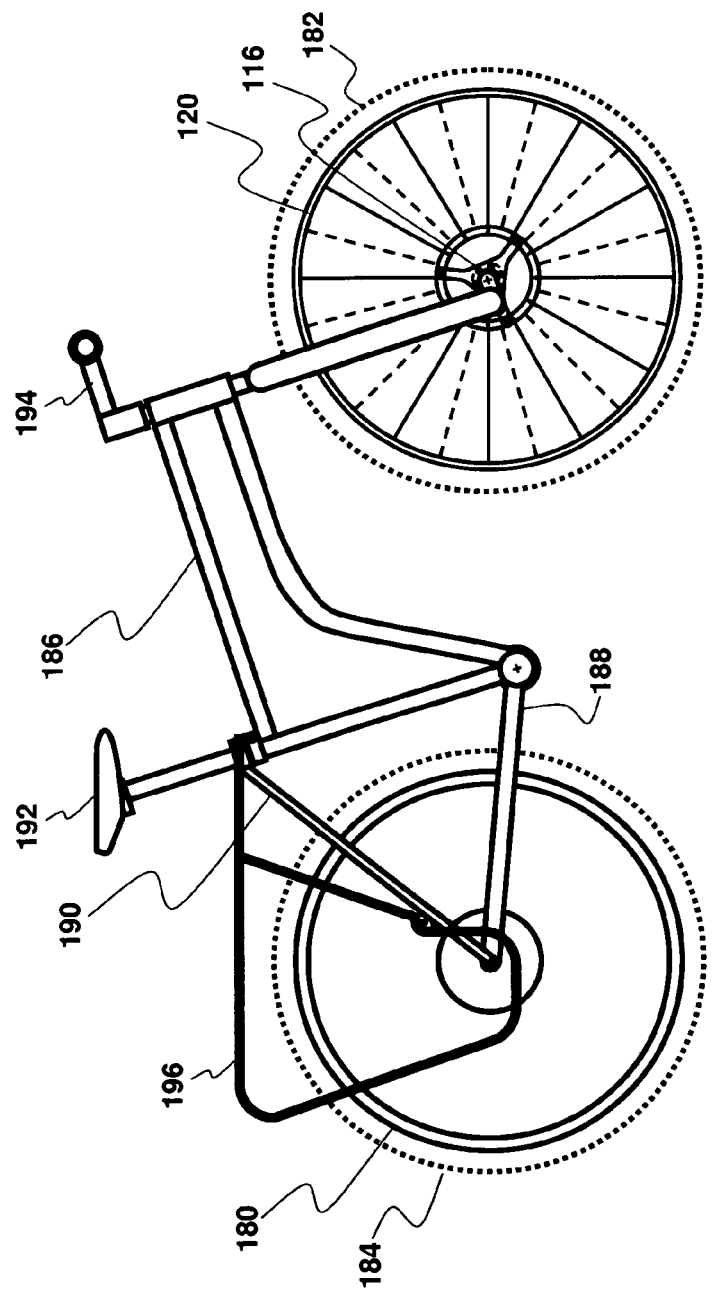
FIG. 9 shows an assembled bicycle using the annulus-based wheel system of FIG. 2.
Figure 11A:
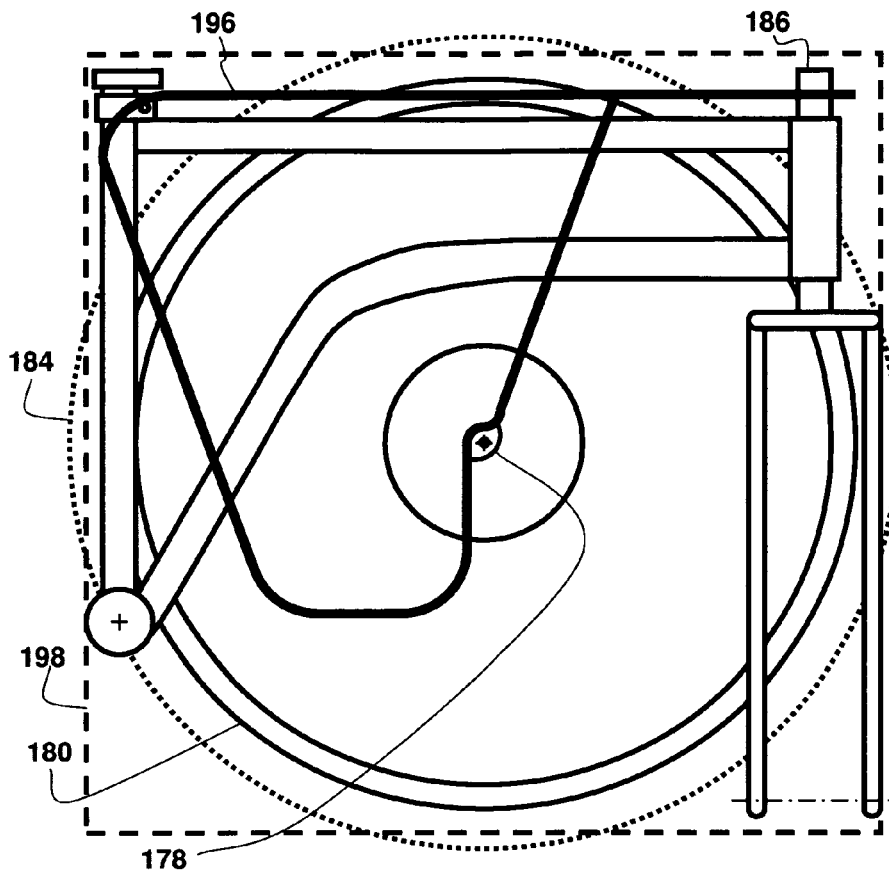
FIG. 11A shows a top view of the largest components of the bicycle of FIG. 9 when packed.
Figure 11B:
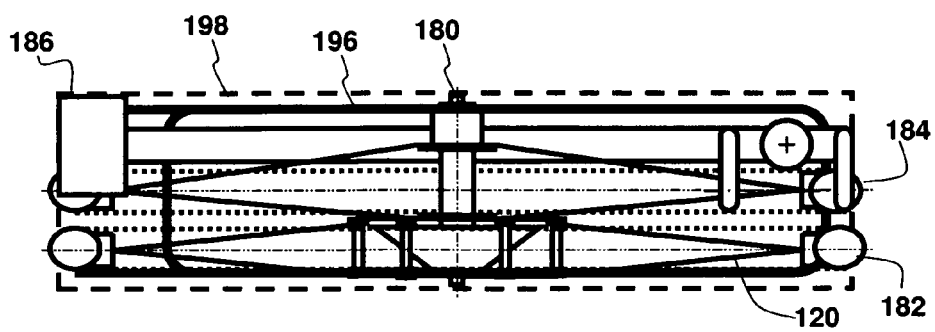
FIG. 11B shows a side view of the largest components of the bicycle of FIG. 9 when packed.

FIG. 9 shows an assembled bicycle using the annulus-based system described previously. FIG. 10 shows the bicycle of FIG. 9 when disassembled. FIG. 11A shows a top view of the disassembled bicycle of FIG. 10 when it is packed. FIG. 11B shows a side view of this disassembled bicycle when packed. Note that some components have been left out of FIG. 11A and FIG. 11B for ease of viewing. The main items shown in these views include: a spoked wheel with central annulus, shown at 120; a user detachable hub shown at 116; a second wheel, shown at 180; a first tire, shown at 182; a second tire, shown at 184; detachable chain stays, shown at 188; detachable seat stays, shown at 190; a seat module, shown at 192; a front handlebar module, shown at 194; and a rear rack module, shown at 196; and a front triangle, shown at 186. Examples of parts not shown include cranks, pedals, and a chain that would be used to convert human power to locomotive force in the rear wheels. Collectively, the front triangle 186, chain stays 188, and seat stays are normally referred to as a frame. The front triangle 186 shown in these figures includes a front fork that is rotationally coupled into a head tube. The front triangle comprises a top tube that connects the head tube to a seat tube. The seat module attaches to one end of the seat tube and there is a bottom bracket (for the cranks, pedals, etc) at the other end of the seat tube. In the configuration shown, there is also a down tube connecting the bottom bracket to the head tube. In some configurations of bicycles, there is only one tube running back from the head tube. For purposes of this disclosure and the appended claims, those configurations would still have a front triangle, despite the fact that no triangular region would be enclosed. The frame can comprise any material capable of being understood by anyone skilled in the art. Examples of frame materials can include carbon steel (which comprises iron, carbon, etc and may include molybdenum and vanadium), stainless steel (which comprises nickel, iron, etc), aluminum, magnesium, titanium, glass, cardboard, carbon fiber reinforced composite, glass fiber reinforced composite, wood, plastic, or boron fiber reinforced composite. Examples of frame manufacturing processes can include welding, brazing, soldering, autoclaving, machining, molding, casting, gluing, painting, anodizing; and vacuum forming.

As noted, the first wheel and the second wheel can have tires. The tires, 182 and/or 184, can be made using any material and process capable of being understood in the art. For example, one or more of the tires 182 and/or 184, can be made of rubber. One or more of the tires 182 and/or 184, can comprise metal studs. One or more of the tires 182 and/or 184, can comprise an inflatable inner tube. Inflation of the inner tube can be performed using a presta valve or a shrader valve. One or more of the tires can be tubeless. The tires can be inflated when packed. The tires can be deflated when packed.

Many human-powerable vehicles, including bicycles, comprise a transmission. This transmission can include gears located on the rear wheel. These gears can be external gears that are shifted using a rear derailleur. These gears can be internal gears located in a multi-speed inner hub in the rear wheel. This multi-speed inner hub can be fixed to the spokes. This multi-speed inner hub can be removable from an annulus that uses spokes to attach to a rim. One example of a multi-speed inner hub is the 14-speed rear hub made by Rohloff in Germany.

Further referring to FIG. 9 and FIG. 10, the system can be configured by a user as a human-powerable bicycle when the annular front wheel, detachable hub, rear wheel, and frame are attached in the following configuration: (a) the detachable hub is attached to the annular front wheel; (b) the detachable hub is attached to the front fork at the frame attachment regions of the front hub axle; and (c) the rear wheel axle is attached to the rear dropout. Note that the part of the front fork where the front wheel is attached can also be referred to as the front dropout or dropouts. The end of the chain stays or seat stays where the rear wheel axle is attached can also be referred to as the rear dropout or dropouts. In the configuration shown in FIG. 9 and FIG. 10, the chain stay and the seat stay must also be attached to each other and the chain stay and the seat stay must be attached to the front triangle.

The dotted lines shown at 198 in FIG. 11A and FIG. 11B illustrate an overall "envelope" of 24 inches by 24 inches by 7 inches that has been placed over a compacted bicycle that uses 26 inch tires. This illustrates that by using the elements discussed in this disclosure, it is possible to pack all of the main components of a 26-inch bicycle into a 24×24×7 inch enclosure, because the tires can be deformed to fit. This is significant because it means that two 26-inch bicycles could be packed into a 24×24×14 inch enclosure that would meet the airlines 62 linear inch requirement.

FIG. 9 shows an assembled bicycle using the annulus-based system described previously. FIG. 10 shows the bicycle of FIG. 9 when disassembled. FIG. 11A shows a top view of the disassembled bicycle of FIG. 10 when it is packed. FIG. 11B shows a side view of this disassembled bicycle when packed. Referring to FIG. 11A and FIG. 11B, the general configuration is one in which the annular front wheel 120 packs around at least part of the hub/axle of the rear wheel on one side. At least part of the frame (i.e. the front triangle 186) is packed on the side of the rear wheel opposite the front wheel in a configuration that is parallel to the front wheel and the rear wheel.

Further referring to FIG. 11A and FIG. 11B, the rear rack module 196 wraps around the other components. This is significant because the sides of the rear rack module 196 can be made of a solid material or a mesh, allowing the rear rack module 196 to protect many of the other components. Furthermore, the rear rack module 196 can have a wheel mounting location, shown at 178, which can be used to secure the second wheel 180 to the rear rack module 196. Similar attachment points can be added to the rear rack module 196 and the front triangle 186 in regions where these modules are adjacent to secure them together. In the embodiment shown in FIG. 11A and FIG. 11B, the spoked wheel with central annulus 120 will be held securely when the second wheel 180 is secured to the rear rack module 196 on both sides. Thus, all of the components shown in FIG. 11A and FIG. 11B would be secured to one another which will prevent them from moving and rubbing against one another during transit. Using a similar approach, the other modules shown in FIG. 9 and FIG. 10, but not shown in FIG. 11A and FIG. 11B (such as the detachable chain stays 188; the detachable seat stays 190; the seat module 192, and the front handlebar module 194) could be added to the assembly shown in FIG. 11A and FIG. 11B and secured to all components to create a monolithic assembly which is substantially rigid for transportation. Additional components typically found on a bicycle, and not shown in FIGS. 9, 10, 11A, and 11B, such as the cranks, pedals, and user detachable hub could be added and attached to this monolithic assembly. By creating such a monolithic assembly, the need for a suitcase is minimized. Properly constructed, an assembly such as that shown in FIG. 11A and FIG. 11B could be covered with a bag and that bag could be a suitably sized and structured bicycle pannier or panniers, totally eliminating the need for a suitcase to be carried or disposed of when the bicycle modules are reconfigured to be a ridable bicycle. This is further facilitated by the fact that bicycle panniers often have rigid sidewalls to prevent the panniers from getting pushed into the bike wheel. These rigid sidewalls become excellent penetration protection for the cover of the compacted bicycle when the panniers are reconfigured to be compacted bicycle cover.

A number of variations and modifications of the disclosed embodiments can also be used. The principles described here can also be used for in applications other than bicycles, and similar human-powered vehicles, such as motorcycles.

While the principles of the disclosure have been described above in connection with specific apparatuses and methods, it is to be clearly understood that this description is made only by way of example and not as limitation on the scope of the disclosure.

What is claimed is:

1. A system for a human-powerable vehicle, the system comprising an inner annular module, wherein the inner annular module comprises:
   a concentric central aperture region having a minimum diameter chosen from the group of at least 25 millimeters, at least 50 millimeters, at least 100 millimeters, at least 150 millimeters, and at least 200 millimeters;
   a hub attachment feature for securing a user detachable hub in the aperture region; and
   a plurality of first spoke attachment points wherein the first spoke attachment points are used to attach steel tension spokes that radiate outward from the inner annular module and wherein the first spoke attachment points are located:
      in a first plane perpendicular to the central axis of the annular module; and
      in a circular configuration; and
   a plurality of second spoke attachment points wherein the second spoke attachment points are used to attach steel tension spokes that radiate outward from the inner annular module and wherein the second spoke attachment points are located:
      in a second plane perpendicular to the central axis of the annular module wherein the second plane is offset and parallel to the first plane; and
      in a circular configuration.

2. The system of claim 1 wherein:
   the system comprises an annular wheel, the annular wheel comprising:
      the inner annular module;
      a circular rim wherein the circular rim is concentric to the central axis of the annular module;
   the concentric central aperture region comprises an opening at least 100 millimeters in diameter;
   the circular rim comprises:
      an outer diameter of greater than a dimension selected from the group comprising 477 millimeters, 533 millimeters, 585 millimeters, 610 millimeters, and 648 millimeters;
      a plurality of third spoke attachment points wherein the third spoke attachment points are located:
         in a third plane perpendicular to the central axis of the annular module; and
         in a circular configuration; and
      a plurality of fourth spoke attachment points wherein the fourth spoke attachment points are located;
         in a fourth plane perpendicular to the central axis of the annular module; and
         in a circular configuration; and
   a plurality of first spokes connected in tension between the first attachment points and the third attachment points; and
   a plurality of second spokes connected in tension between the second attachment points and the fourth attachment points.

3. The system of claim 2 wherein:
   the system further comprises a user detachable hub comprising:
      a hub axle;
      two frame attachment regions, one at each end of the hub axle;
      a plurality of rotary bearings that rotatably couple the hub axle to a rotating member; and
      a wheel attachment feature located on the rotating member that can be used to securely and detachably attach the hub to the hub attachment feature without affecting the tension in the spokes;
   the inner annular module further comprises a separable first annular disk, a separable second annular disk, and a plurality of spacing elements;
   the first spoke attachment points are located on the first annular disk;
   the second spoke attachment points are located on the second annular disk;
   the spacing elements connect the first disk to the second disk;
   the third spoke attachment points comprise holes in the circular rim;
   the fourth spoke attachment points comprise holes in the circular rim; and
   the third spoke attachment points are coplanar to the fourth spoke attachment points.

4. The system of claim 3 wherein:
   the annular wheel is annular front wheel of a human powerable bicycle;
   the user detachable hub is a detachable front hub of a human powerable bicycle;
   the wheel attachment features located on the rotation member of the user detachable hub further comprises three fingers that radiate outwards from the center of rotation of the user detachable hub;
   the spacing elements comprise threaded tubular structures;
   the spacing elements are connected to the first disk using bolts;
   the spacing elements are connected to the second disk using bolts;
   the system further comprises a rear wheel and a frame;
   the rear wheel further comprises a rear wheel axle;
   the frame further comprises:
      a front fork that is rotatably coupled to a head tube;
      a top tube that has one end rigidly coupled to the head tube;
      a seat tube that is coupled to end of the top tube on the end opposite the top tube;
      a bottom bracket that is coupled to the seat tube;
      a chain stay that has one end coupled to the bottom bracket and a rear dropout on the other end;
   the system is user packable into a rectangular volume having a total length plus width plus height no greater than 62 linear inches when the annular front wheel, detachable front hub, rear wheel, and at least part of the frame are placed relative to one another in the following configuration:
      the detachable front hub is removed from the inner annular module of the annular front wheel;
      the annular front wheel is placed in a plane parallel to the rear wheel in a position where at least part of the rear wheel axle is inside the aperture region of the inner annular module of the annular front wheel;
      at least part of the frame is placed in a plane parallel to the rear wheel on the side opposite the annular front wheel; and
      the detachable hub is placed in a remaining space in the rectangular volume; and the system is user configurable as a human-powerable bicycle when the annular front wheel, detachable hub, rear wheel, and frame are attached in the following configuration:
  the detachable hub is attached to the annular front wheel;
  the detachable hub is attached to the front fork at the frame attachment regions of the front hub axle; and
  the rear wheel axle is attached to the rear dropout.

5. The system of claim 4 wherein:
the system further comprises a rear rack;
the rear rack is packable into the rectangular volume along with the annular front wheel, rear wheel, and at least part of the frame when:
  the rear rack is placed over the annular front wheel, rear wheel, and at least part of the frame; and
  the rear rack is attached to both sides of the rear wheel axle;
the system further comprises rotation and orientation features comprising:
  an orientation feature on the inner annular module;
  an orientation feature on the detachable hub;
  a rotation feature on the inner annular module; and
  a rotation feature on the detachable hub;
the frame comprises magnesium;
the rim of the annular front wheel comprises birch;
the rear wheel comprises an extruded aluminum rim;
the rear wheel comprises a multi-speed inner hub;
the spokes comprise nickel and brass;
there are a total of 24 spokes;
the first spoke attachment points comprise axial holes;
the second spoke attachment points comprise axial holes;
the third spoke attachment points comprise radial holes;
the fourth spoke attachment points comprise radial holes;
the system further comprises a front tire and a rear tire; and
the front tire comprises metal studs.

6. The system of claim 1 wherein:
the inner annular module further comprises a first annular disk, a second annular disk, and a plurality of spacing elements;
the first spoke attachment points are located on the first annular disk;
the second spoke attachment points are located on the second annular disk;
the spacing elements connect the first disk to the second disk.

7. The system of claim 1 wherein:
the system further comprises a detachable hub comprising:
  a hub axle;
  two frame attachment regions, one at each end of the hub axle;
  a plurality of rotary bearings that rotatably couple the hub axle to a rotating member; and
  a wheel attachment feature located on the rotating member that can be used to securely and detachably attach the hub to the hub attachment feature.

8. The system of claim 1 wherein:
the inner annular module has an orientation feature used to orient the axes of a hub; and
the inner annular module has a rotation feature used to orient the rotation of attachment elements of a hub.

9. The system of claim 1 wherein:
the system further comprises a user detachable hub; and
attachment of the user detachable hub to the inner annular module comprises a snap element.

10. The system of claim 1 wherein:
the system further comprises a user detachable hub; and
attachment of the user detachable hub to the inner annular module comprises a bolt.

11. The system of claim 1 wherein:
the first spoke attachment points comprise axial holes; and
the second spoke attachment points comprise axial holes.

12. The system of claim 1 wherein:
the inner annular module is an inner annular module for a bicycle.

13. The system of claim 1 wherein:
the inner annular module is an inner annular module for a front wheel.

14. The system of claim 1 wherein:
the system comprises an annular wheel, the annular wheel comprising:
  the inner annular module;
  a circular rim wherein the circular rim is concentric to the central axis of the annular module; and
  a plurality of spokes;
the circular rim comprises a plurality of rim spoke attachment points wherein the rim spoke attachment points:
  are located in a circular configuration;
  are coplanar; and
  comprise radial holes; and
the spokes:
  comprise nickel and brass; and
  are connected in tension between the inner annular module and the rim spoke attachment points.

15. A system for compact storage of a human powerable bicycle, the system comprising a ring shaped module and a detachable hub, wherein:
the detachable hub is mounted in a central opening of the ring shaped module;
the detachable hub is mounted concentric to the outer diameter of the ring shaped module;
the detachable hub comprises:
  an axle;
  two frame attachment regions, one at each end of the axle;
  a plurality of rotary bearings that rotatably couple the axle to a rotating member; and
  a wheel attachment feature located on the rotating member in a position that allows the rotating member to be detachably attached to the ring shaped module;
the central opening has a diameter greater than or equal to 50 millimeters; and
the ring-shaped module comprises:
  a plurality of first spoke attachment points located in a circular configuration in a first plane wherein the first plane is perpendicular to the central axis of the detachable hub; and
  a plurality of second spoke attachment points located in a circular configuration in a second plane that is perpendicular to the central axis of the detachable hub wherein:
    the second plane is parallel to the first plane; and
    the second plane is offset from the first plane.

16. The system of claim 15 wherein:
the ring shaped module further comprises a first annular disk, a second annular disk, and a plurality of spacing elements;
the first spoke attachment points are located on the first annular disk;
the second spoke attachment points are located on the second annular disk;

the spacing elements connect the first disk to the second disk.

17. The system of claim 15 wherein:
the system comprises an annular wheel, the annular wheel comprising:
   the inner annular module;
   a rim; and
   spokes in tension connecting the inner annular module to the rim.

18. A method for packing a bicycle in a small space and assembling the bicycle for riding, the method comprising the steps of:
   establishing an annular front wheel wherein establishing an annular front wheel further comprises establishing an annulus;
   attaching the first end of a plurality of spokes to the annulus where attaching further comprises attaching in a first plane and attaching in a second plane where the first plane and the second plane are perpendicular to the central axis of the annulus and offset from each other;
   securing the second end of the spokes to a rim where securing further comprises placing the spokes through holes in the rim that are in a third plane perpendicular to the central axis of the annulus, and concentric to the central axis of the annulus;
   tensioning the spokes;
   establishing a hub module, wherein establishing a hub module further comprises establishing a hub module axle and rotatably coupling a rotating member to the hub module axle;
   packing the bike by placing the annular front wheel at least partially over a rear wheel axle of a rear wheel; and
   assembling the bike for riding by:
      detachably attaching the rotating member of the hub module to an annulus in a position where the hub module axle is aligned with the central axis of the annulus,
      attaching the hub module axle to the front fork of the bicycle, and
      attaching the rear wheel to the rear dropouts of the bicycle.

19. The method of claim 18 wherein:
establishing an annulus further comprises the steps of:
   establishing a first annular disk, which further comprises the steps of:
      locating the first annular disk at a position concentric to the central axis of the annulus; and
      locating the first annular disk at a position perpendicular to the central axis of the annulus;
   establishing a second annular disk, which further comprises the steps of:
      locating the second annular disk at a position concentric to the central axis of the annulus; and
      locating the annular disk at a position perpendicular to the central axis of the annulus;
   spacing the first annular disk away from the second annular disk by attaching spacing elements between the first annular disk and the second annular disk;
   attaching in a first plane comprises attaching to the first annular disk; and
   attaching to the second plane comprises attaching to the second annular disk.

20. The method of claim 18 wherein:
packing further comprises packing the bike into a space where the length plus width plus height is less than 62 linear inches.

* * * * *